(12) United States Patent
Sonwane et al.

(10) Patent No.: US 12,074,848 B2
(45) Date of Patent: Aug. 27, 2024

(54) EFFICIENT AND SECURE UNIVERSAL/APP LINKS

(71) Applicant: SAP SE, Walldorf (DE)

(72) Inventors: Tejram Jagannath Sonwane, Bangalore (IN); Ankit Kumar, Bangalore (IN)

(73) Assignee: SAP SE, Walldorf (DE)

(*) Notice: Subject to any disclaimer, the term of this patent is extended or adjusted under 35 U.S.C. 154(b) by 441 days.

(21) Appl. No.: 17/548,657

(22) Filed: Dec. 13, 2021

(65) Prior Publication Data
US 2023/0188498 A1    Jun. 15, 2023

(51) Int. Cl.
*H04L 9/40* (2022.01)
*H04W 12/06* (2021.01)

(52) U.S. Cl.
CPC .......... *H04L 63/0236* (2013.01); *H04L 63/08* (2013.01); *H04L 63/101* (2013.01); *H04W 12/06* (2013.01)

(58) Field of Classification Search
CPC ................. H04L 63/0236; H04L 63/08; H04L 63/101; H04W 12/06
See application file for complete search history.

(56) References Cited

U.S. PATENT DOCUMENTS

| | | | |
|---|---|---|---|
| 2007/0067495 A1* | 3/2007 | Levy .................... | G06F 16/9574 707/E17.115 |
| 2015/0180981 A1* | 6/2015 | Tan ........................ | H04L 67/02 709/219 |
| 2018/0375946 A1* | 12/2018 | Brown .................. | H04L 67/535 |
| 2021/0194805 A1* | 6/2021 | Li .......................... | H04W 72/04 |

* cited by examiner

*Primary Examiner* — Ali S Abyaneh
(74) *Attorney, Agent, or Firm* — Sterne, Kessler, Goldstein & Fox P.L.L.C.

(57) ABSTRACT

Embodiments are described for a user device comprising a transceiver configured to communicate with a server and a processor communicatively coupled to the transceiver. The processor is configured to receive a uniform resource locator (URL) from the server and determine that the URL is a universal link. The processor is further configured to authenticate the universal link and parse the universal link to obtain a domain link. The processor is further configured to connect to the domain link.

11 Claims, 9 Drawing Sheets

EFFICIENT AND SECURE UNIVERSAL/APP LINKS

BACKGROUND

Universal links are uniform resource locators (URLs) that point to both webpages and applications of a user device. For example, a universal link may be used to access a webpage via a web browser. When clicked, the universal link may also trigger an application of the user device to launch. The user device may check whether the universal link is authenticated to be operated in the application. In addition, the universal link may contain sensitive and/or confidential information, which requires protection when the universal link is shared with a third party. In some embodiments, the universal links are also referred to as app links, for example, in an ANDROID® system.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
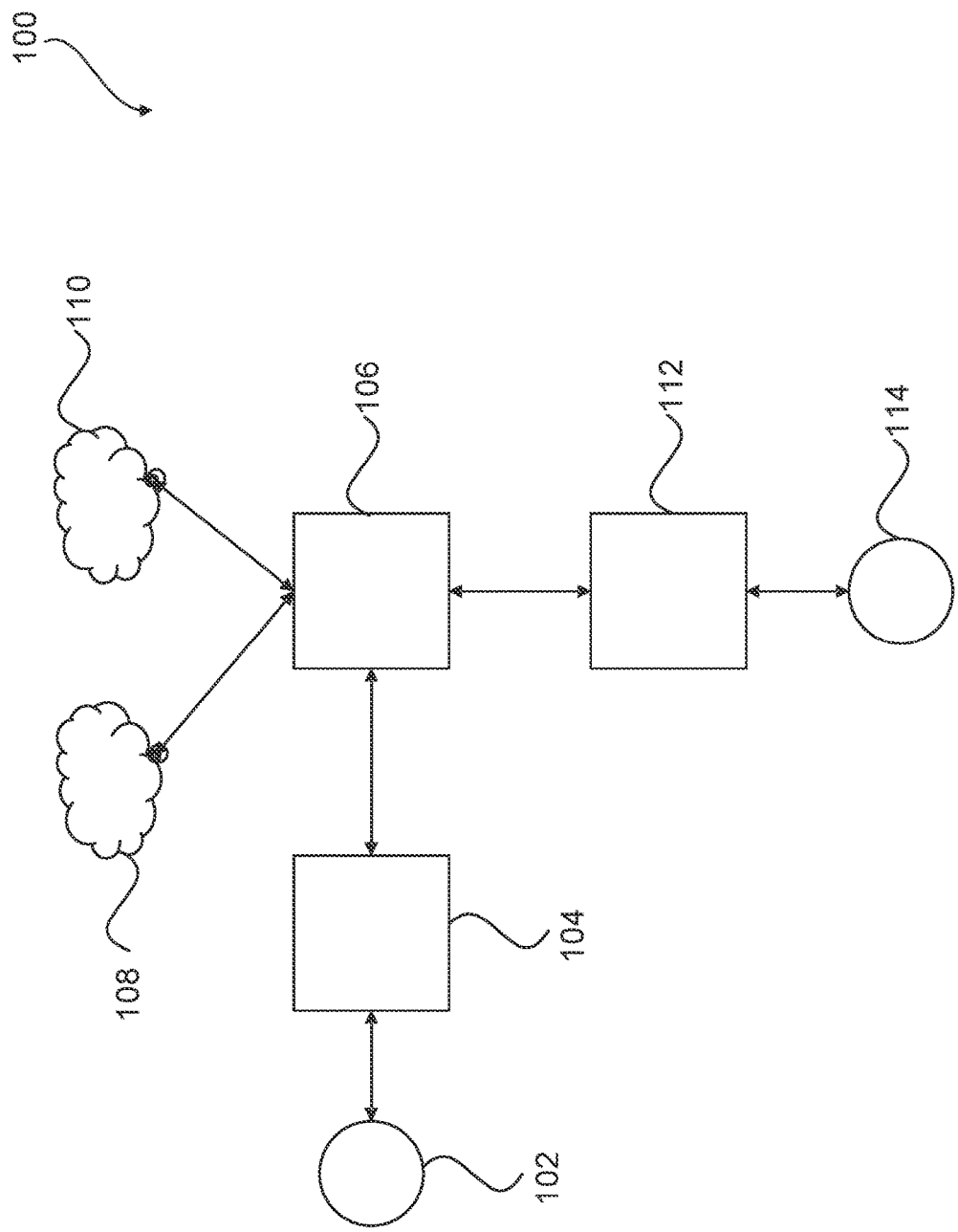
FIG. 1 illustrates an example system implementing efficient and secure universal/app links, according to some embodiments of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments of this disclosure include apparatus, system, computer program product, and method embodiments for implementing efficient and secure universal/app links. Universal links, as referred to in an IOS® system for example, and app inks, as referred to in an ANDROID® system for example, point to both webpages and applications of a user device. In this application, an app link is also referred to as a universal link.

In some embodiments, a user device receives a uniform resource locator (URL). The user device may determine that the URL is a universal link, which corresponds to an application of the user device. For example, the user device may determine a standard domain based on the URL. The standard domain may be a webpage. The user device may further retrieve a list of universal link domains from the user device. If the list of universal link domains includes the standard domain, the user device determines that the URL is a universal link and attempts to launch an application of the user device. Otherwise, the user device determines that the URL is not a universal link and opens the URL in a default web browser of the user device.

In some embodiments, to launch the application, the user device may determine that the universal link points to the application. For example, the list of universal link domains may indicate that the universal link corresponds to the application. For another example, the universal link itself may indicate the application. The user device then extracts a list of domains supported by the application from the application. If the list of domains includes the standard domain, the user device may launch the application.

In some embodiments, the user device further authenticates the application to connect to the standard domain. For example, the user device may check whether the application is authorized to access the standard domain. In some embodiments, the application corresponds to an application identification. The user device obtains a list of application identifications, which are authorized to access the standard domain, from a server supporting the standard domain. If the list of application identifications includes the application identification, the user device authenticates the application and the application connects to the standard domain.

In some embodiments, the list of domains supported by the application was built into the application when the application was created. For example, the list of domains supported by the application is included in an entitlement file at build before uploading to an IOS® App Store or an ANDROID® Play Store, for example. Therefore, the application supports a finite number of domains. In some embodiments, a user may wish to access a domain that is not in the list of domains using the application. For example, the domain may be added after the application is built. In other embodiments, the domain may not be in the list of domains because a size of the application is limited. In such a case, the server may generate a universal link based on the domain not in the list of domains and a standard domain that is in the list of domains.

In some embodiments, the server may support a first domain that is not in the list of domains and a second domain that is in the list of domains. The server may generate a universal link based on the first domain and the second domain. For example, the universal link may include the second domain as a standard domain and include the first domain as one or more parameters. When the user device receives the universal link, the user device may launch the application and authenticate the universal link based on the second domain included in the universal link. The user device may then extract the first domain from the universal link and may connect to the first domain via the application. In this way, there is no need to add the first domain to the list of domains of the application.

In some embodiments, the universal link may include sensitive and/or confidential information. For example, the universal link may include domain parameters describing the first domain. To protect the domain parameters, the server may encrypt the domain parameters before generating the universal link. When the user device receives the universal link, the user device may decrypt the domain parameters and reconstruct the first domain.

These and other features of example embodiments will now be discussed in greater detail with respect to the corresponding figures.

FIG. 1 illustrates an example system implementing efficient and secure universal/app links, according to some embodiments of the disclosure. Example system 100 is provided for the purpose of illustration only and does not limit the disclosed embodiments. System 100 may include, but is not limited to, a user 102, a user device 104, a server 106, a domain 108, a domain 110, a user device 112, and a user 114. The user 102 corresponds to the user device 104 and the user 114 corresponds to the user device 112. The user devices 104 and 112 may include, but are not limited to, wireless communication devices, smartphones, laptops, desktops, tablets, personal assistants, monitors, televisions, wearable devices, Internet of Things (IoT) devices, vehicle communication devices, and the like. The server 106 may include, but not limited to, a web server, an internet server, a service provider, a storage center, a database server, a file server, an email server, a web proxy server, a DNS server, an FTP server, and the like. In some embodiments, the server 106 supports the domains 108 and 110. For example, the user devices 104 and 112 may connect to and access the domains 108 and 110 via the server 106.

In some embodiments, the user 102 may want to transmit a piece of information to the user 114. The user 102 may transmit the piece of information via the user device 104 and the user 114 may receive the piece of information via the user device 112. In some embodiments, the piece of information is stored in the domain 108. In such a case, the user 102 may transmit, via the user device 104, a domain link of the domain 108 to the user device 112. In some embodiments, the user device 104 may transmit the domain link directly to the user device 112. The user device 104 may also transmit the domain link indirectly to the user device 112 via the server 106. The user 114 may access the piece of information, via the user device 112, in the domain 108 based on the domain link. In some embodiments, the user device 104 may generate the domain link. In other embodiments, the server 106 may generate the domain link and transmit the domain link to the user device 104.

In some embodiments, the user 114 may access the domain 108 via an application of the user device 112. For example, the domain link may be a universal link that can launch the application of the user device 112. For example, the user device 112 may determine that the domain 108 is included in a list of domains supported by the application of the user device 112. In such a case, after receiving the domain link, the user device 112 launch the application and connect to the domain 108 via the application.

In some embodiments, the piece of information may be stored in the domain 110. The server 106 or the user device 104 may generate a second domain link that corresponds to the piece of information stored in the domain 110. In some embodiments, the list of domains supported by the application of the user device 112 may not include the domain 110 and thus the second domain link may not trigger the user device 112 to launch the application. In such a case, the server 106 may generate a universal link corresponding to the second domain link. For example, the server 106 may generate the universal link that includes a standard domain of the domain 108 and the second domain link. The server 106 may transmit the universal link directly to the user device 112 or indirectly via the user device 104. After receiving the universal link, the user device 112 may launch the application based on the standard domain of the domain 108 that is included in the universal link. The user device 112 may then parse the universal link to extract the second domain link. The application of the user device 112 may connect to the domain 110 and retrieve the piece of information based on the second domain link.

In some embodiments, the user device 104 may encrypt the second domain link before the server 106 generates the universal link. For example, the user device 104 may include an encryption module that encrypts the second domain link. The user device 104 then transmits the encrypted second domain link to the server 106, which generates the universal link based on the encrypted second domain link. In some embodiments, the server 106 may encrypt the second domain link. For example, the user device 104 may transmit the second domain link to the server 106. The server 106 may include an encryption module that encrypts the second domain link. The server 106 may then generates the universal link based on the encrypted second domain link. On the other hand, the user device 112 may decrypt the second domain link after parsing the universal link.

Figure 2:
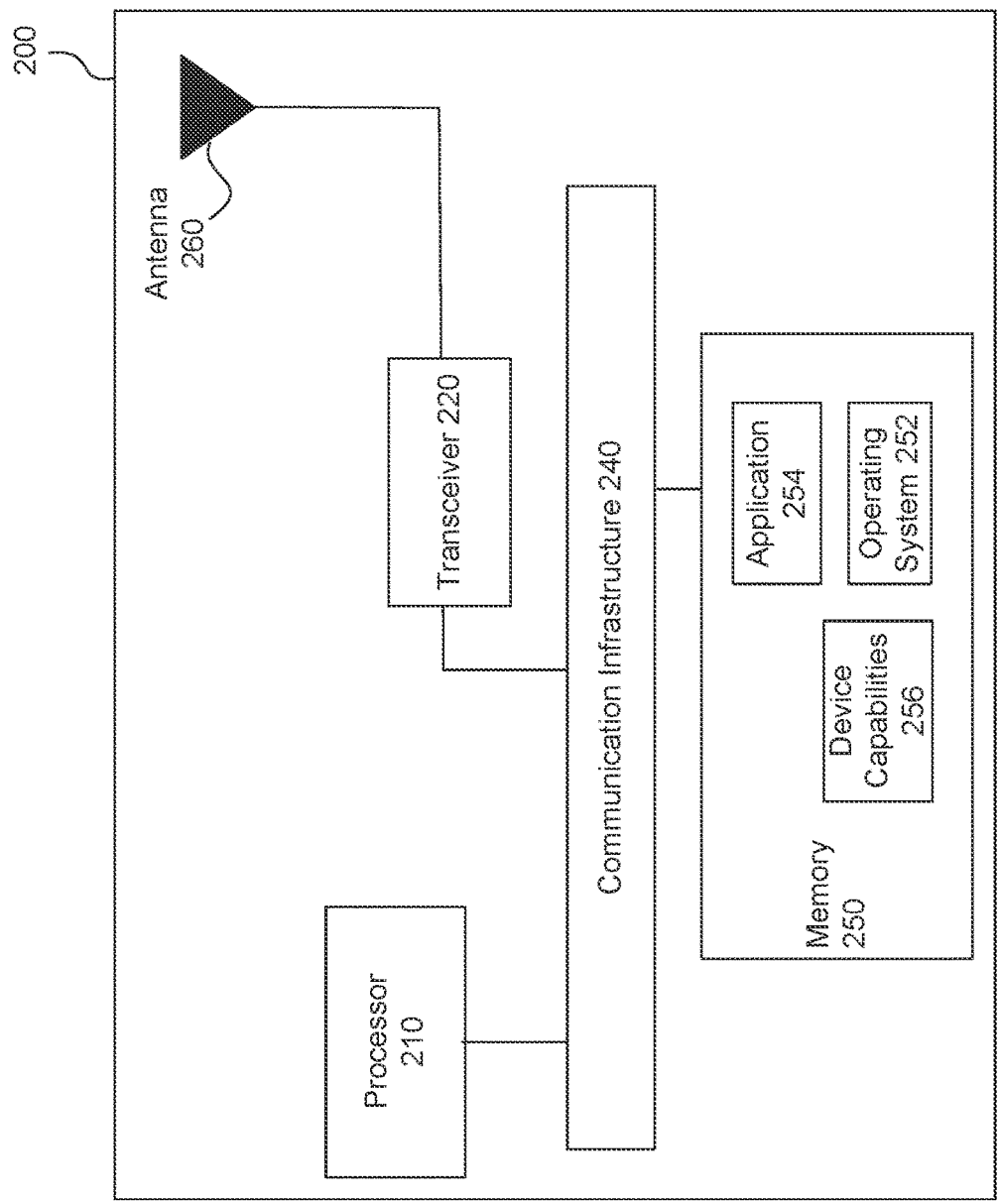
FIG. 2 illustrates a block diagram of an example system of a device for an efficient and secure universal/app link system, according to some embodiments of the disclosure.

FIG. 2 illustrates an example system of a device for an efficient and secure universal/app link system, according to some embodiments of the disclosure. The system 200 may be any of the electronic devices (e.g., the user devices 104 and 112, and the server 106) of the system 100. The system 200 includes a processor 210, one or more transceivers 220, a communication infrastructure 240, a memory 250, an operating system 252, an application 254, device capabilities 256, and one or more antennas 260. Illustrated systems are provided as exemplary parts of system 200, and system 200 may include other circuit(s) and subsystem(s). Also, although the systems of system 200 are illustrated as separate components, the embodiments of this disclosure may include any combination of these, e.g., less, or more components.

The memory 250 may include random access memory (RAM) and/or cache, and may include control logic (e.g., computer software) and/or data. The memory 250 may include other storage devices or memory. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by wireless system 200 and/or a user of wireless system 200. The applications in the application 254 may include applications such as, but not limited to, radio streaming, video streaming, remote control, and/or other user applications. In some embodiments, the device capabilities 256 may be stored in the memory 250. For example, the device capabilities 256 include computational complexity capabilities, processing speed, and other capabilities.

The system 200 may also include the communication infrastructure 240. The communication infrastructure 240 provides communication between, for example, the processor 210, the one or more transceivers 220, and the memory 250. In some implementations, the communication infrastructure 240 may be a bus.

The processor 210, alone, or together with instructions stored in the memory 250 performs operations enabling system 200 of the system 100 to implement efficient and secure universal/app links, as described herein. Alternatively, or additionally, the processor 210 can be "hard coded" to implement mechanisms for the multi-uplink scheduling, as described herein The one or more transceivers 220 transmit and receive communications signals support mechanisms for the multi-uplink scheduling. Additionally, the one or more transceivers 220 transmit and receive communications signals that support mechanisms for measuring communication link(s), generating and transmitting system information, and receiving the system information. According to some embodiments, the one or more transceivers 220 may be coupled to antenna 26W to wirelessly transmit and receive the communication signals. Antenna 260 may include one or more antennas that may be the same or different types. The one or more transceivers 220 allow system 200 to communicate with other devices that may be wired and/or wireless. In some examples, the one or more transceivers 220 may include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some embodiments of this disclosure, the one or more transceivers 220 may include a cellular subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver.

As discussed in more detail below with respect to FIGS. 3-8, processor 210 may implement different mechanisms for the efficient and secure universal/app link with respect to the system 100 of FIG. 1.

Figure 3:
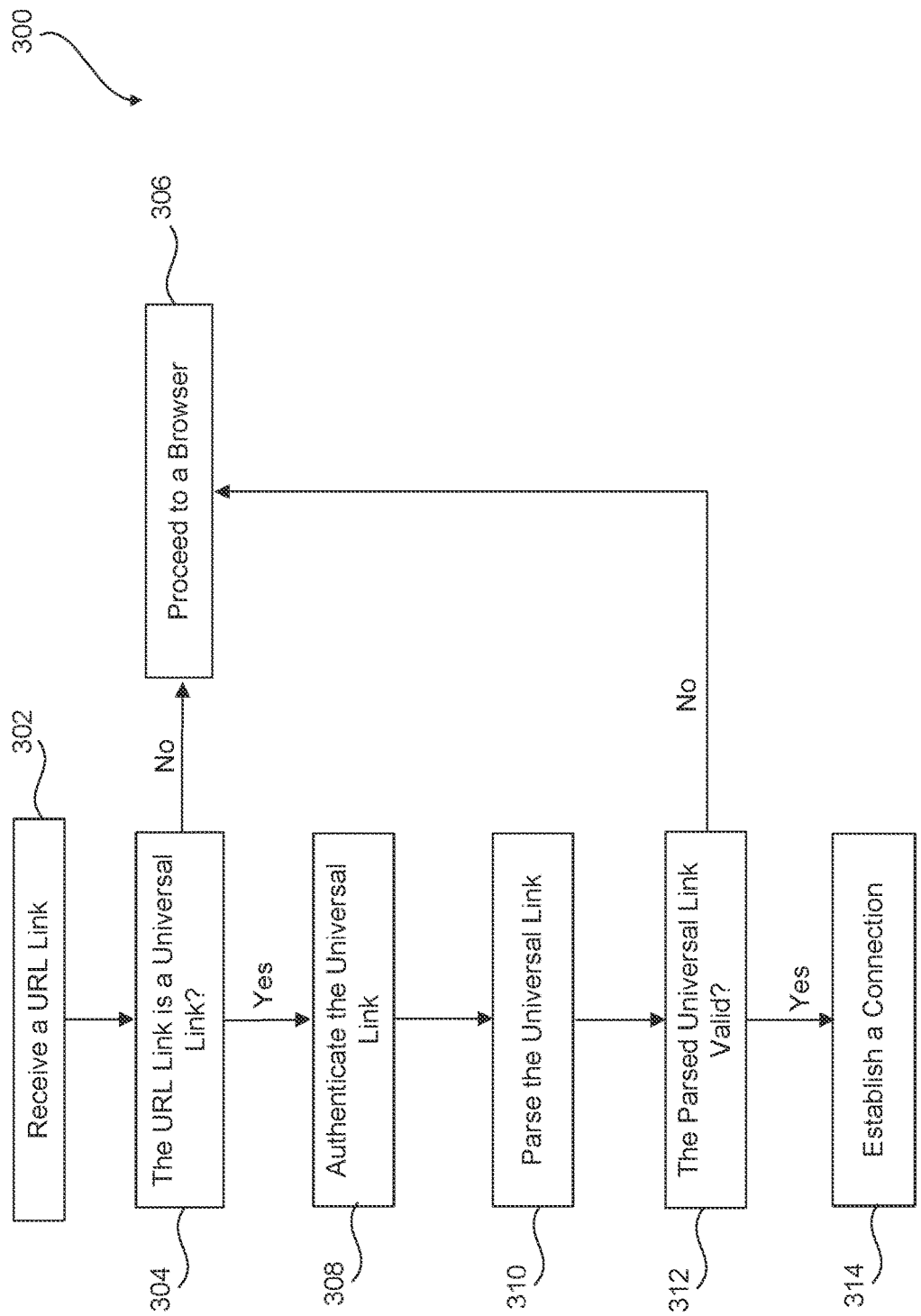
FIG. 3 illustrates an example method for an efficient and secure universal/app link in a user device, according to embodiments of the disclosure.

FIG. 3 illustrates an example method for an efficient and secure universal/app link in a user device, according to embodiments of the disclosure. As a convenience and not a limitation, FIG. 3 may be described with regard to elements of FIGS. 1, 2, and 9. Method 300 may represent the operation of electronic devices (e.g., the user devices 104 and 112, and the server 106) implementing the efficient and secure universal/app link. The example method 300 may also be performed by system 200 of FIG. 2, controlled or implemented by processor 210, and/or computer system 900 of FIG. 9. But method 300 is not limited to the specific embodiments depicted in those figures and other systems may be used to perform the method, as will be understood by those skilled in the art. It is to be appreciated that not all operations may be needed, and the operations may not be performed in the same order as shown in FIG. 3.

At 302, a user device, such as the user device 112 receives a URL link. In some embodiments, the user device may receive the URL link from another user device, such as the user device 104. In other embodiments, the user device may receive the URL link from a server, such as the server 106. The user device may receive the URL link via a wireless connection or a wired connection.

At 304, the user device determines whether the URL link is a universal link. In some embodiments, the user device may extract a standard domain from the URL link. Furthermore, the user device may include a list of universal link domains. If the list of universal link domains includes the standard domain, the user device may determine that the URL link is a universal link. The control moves to 308.

At 308, the user device may authenticate the universal link so that an application may open the universal link. In some embodiments, the user device checks whether a standard domain corresponding to the universal link is supported by the application. The user device may also check whether the application is authorized to access the standard domain. More details of authenticating the universal link are discussed in FIG. 4 below.

At 310, the user device may parse the universal link to obtain a domain link. In some embodiments, the domain link stores a piece of information that is shared between user devices. For example, the piece of information is stored in the domain 110 and the domain link may correspond to the domain 110. The user device 104 may share the domain link to the user device 112, which may obtain that piece of information from the domain 110 based on the domain link.

At 312, the user device checks whether the parsed universal link is valid. In other words, the user device checks whether the domain link is valid. More details are discussed below in FIG. 5. If the domain link is valid, the control moves to 314.

At 314, the user device establishes a connection with a domain corresponding to the domain link. For example, the user device 112 may establish a connection with the domain 110 based on the domain link. The connection may be a wireless connection or a wired connection. The user device 112 may further extract the piece of information, which is shared by the user device 104, from the domain 110 based on the domain link. In some embodiments, the user device 112 may transmit a request for connecting to the domain link to the server 106. The server 106 may authenticate the user device 112 based on the request for connecting to the domain link. For example, the server 106 may determine that the request corresponds to the domain 110 and retrieve a list of app identifications that are authorized to access the domain 110. The server 106 may extract an app identification of the application of the user device 112 from the request and determine that the list of app identifications includes the app identification. In such a case, the server may transmit an approval to the user device 112 to approve the user device 112 to connect with the domain link.

Referring back to 304, if the user device determines that the URL link is not a universal link, the control moves to 306.

At 306, the user device proceeds to a browser. For example, the user device may launch a default browser and open the URL link using the default browser. In other words, the URL link is treated as a webpage address that can be opened by a browser.

Referring back to 312, if the user device determines that the parsed universal link is not valid, the control moves to 306. Similar to the discussion above, at 306, the user device launches the default browser and opens the universal link in the default browser. In other words, the parsed universal link is ignored and the user device proceeds with the universal link instead.

Figure 4:
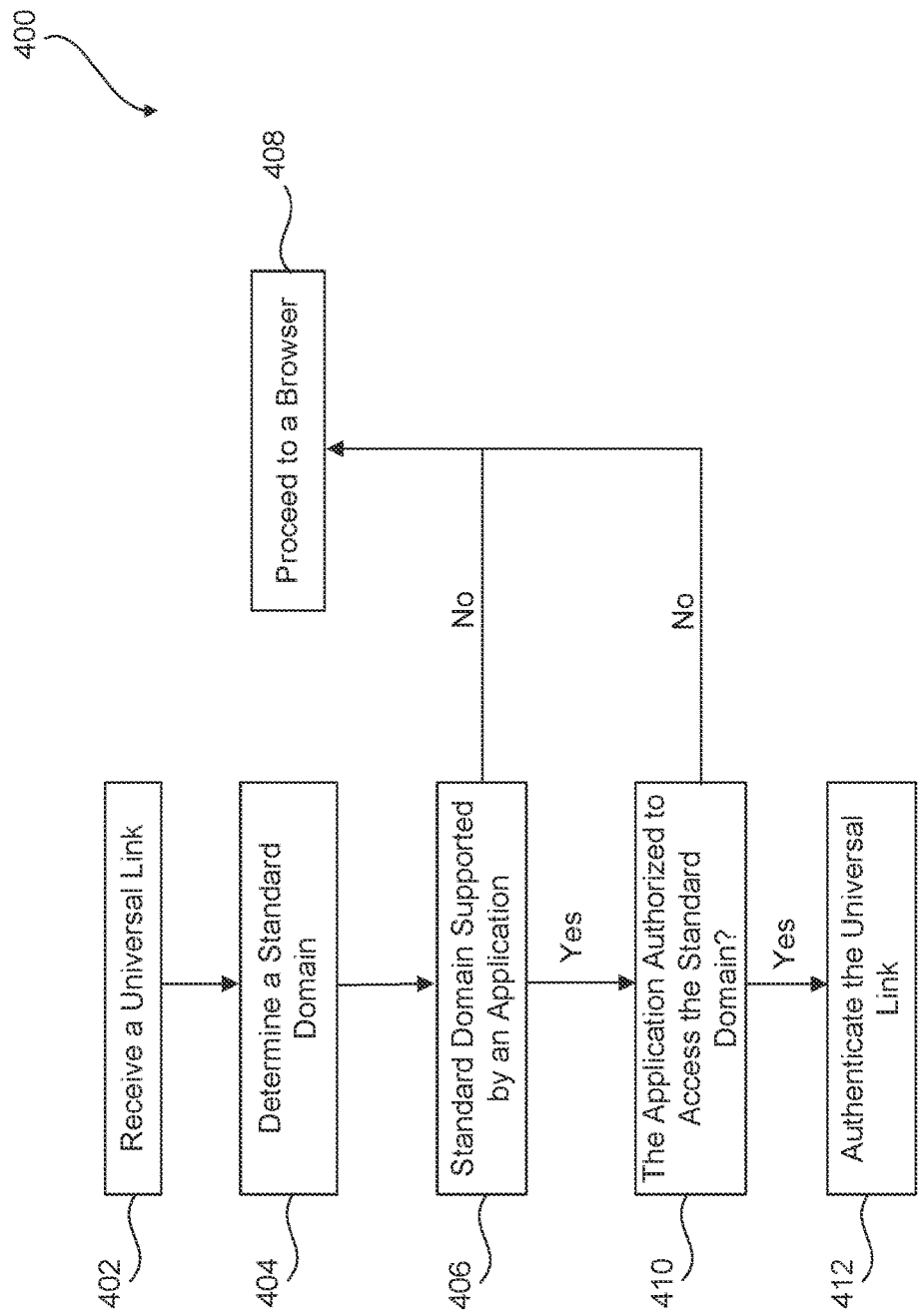
FIG. 4 illustrates an example method for authenticating a universal link, according to embodiments of the disclosure.

FIG. 4 illustrates an example method for authenticating a universal link, as described in 308 of FIG. 3. As a convenience and not a limitation, FIG. 4 may be described with regard to elements of FIGS. 1, 2, and 9. Method 400 may represent the operation of electronic devices (e.g., the user devices 104 and 112, and the server 106) implementing authenticating a universal link. The example method 400 may also be performed by system 200 of FIG. 2, controlled or implemented by processor 210, and/or computer system 900 of FIG. 9. But method 400 is not limited to the specific embodiments depicted in those figures and other systems may be used to perform the method, as will be understood by those skilled in the art. It is to be appreciated that not all operations may be needed, and the operations may not be performed in the same order as shown in FIG. 4.

At 402, the user device receives the universal link. As discussed in 304 of FIG. 3, the user device determines that the URL link is a universal link.

At 404, the user device determines a standard domain based on the universal link. For example, the universal link may include the standard domain. In some embodiments, the standard domain may correspond to a physical location of a user of the user device. For example, the user may be registered as a North American user. Thus, the standard domain may be a North American domain.

At 406, the user device determines whether the standard domain is supported by an application of the user device. For example, the user device may retrieve a list of domains supported by the application. The list of domains may be hard-coded into the application when built. If the list of domains includes the standard domain, the user device determines that the standard domain is supported by the application and the control moves to 410.

At 410, the user device determines whether the application is authorized to access the standard domain. In some embodiments, the user device may transmit a request for an authentication file of the standard domain to the server, such as the server 106. The server may generate and transmit the authentication file to the user device. The authentication file may include a list of app identifications indicating applications that are authorized to access the standard domain. For example, in an IOS® system, the authentication file may be an apple-app-site-association (AASA) file. In an ANDROID® system, the authentication file may be an asset-link file. The user device may further extract an app identification of the application of the user device. If the authentication file includes the app identification of the application, the user device may determine that the application is authorized to access the standard domain. In such a case, the control moves to 412.

At 412, the user device determines that the universal link is authenticated and launches the application to further process the universal link.

Referring back to 406, if the list of domains does not include the standard domain, the user device may determine that the standard domain is not supported by the application. In such a case, the control moves to 408.

At 408, the user device proceeds to a browser. For example, the user device may launch a default browser and open the universal link using the default browser. In such a case, the user device no longer attempts to open the universal link using the application, but treats the universal link as a common URL to be opened by a browser.

Referring back to 410, if the authentication file does not include the app identification of the application, the user device may determine that the application is not authorized to access the standard domain. In such a case, the control moves to 408. At 408, the user device may launch the default browser and open the universal link in the default browser.

Figure 5:
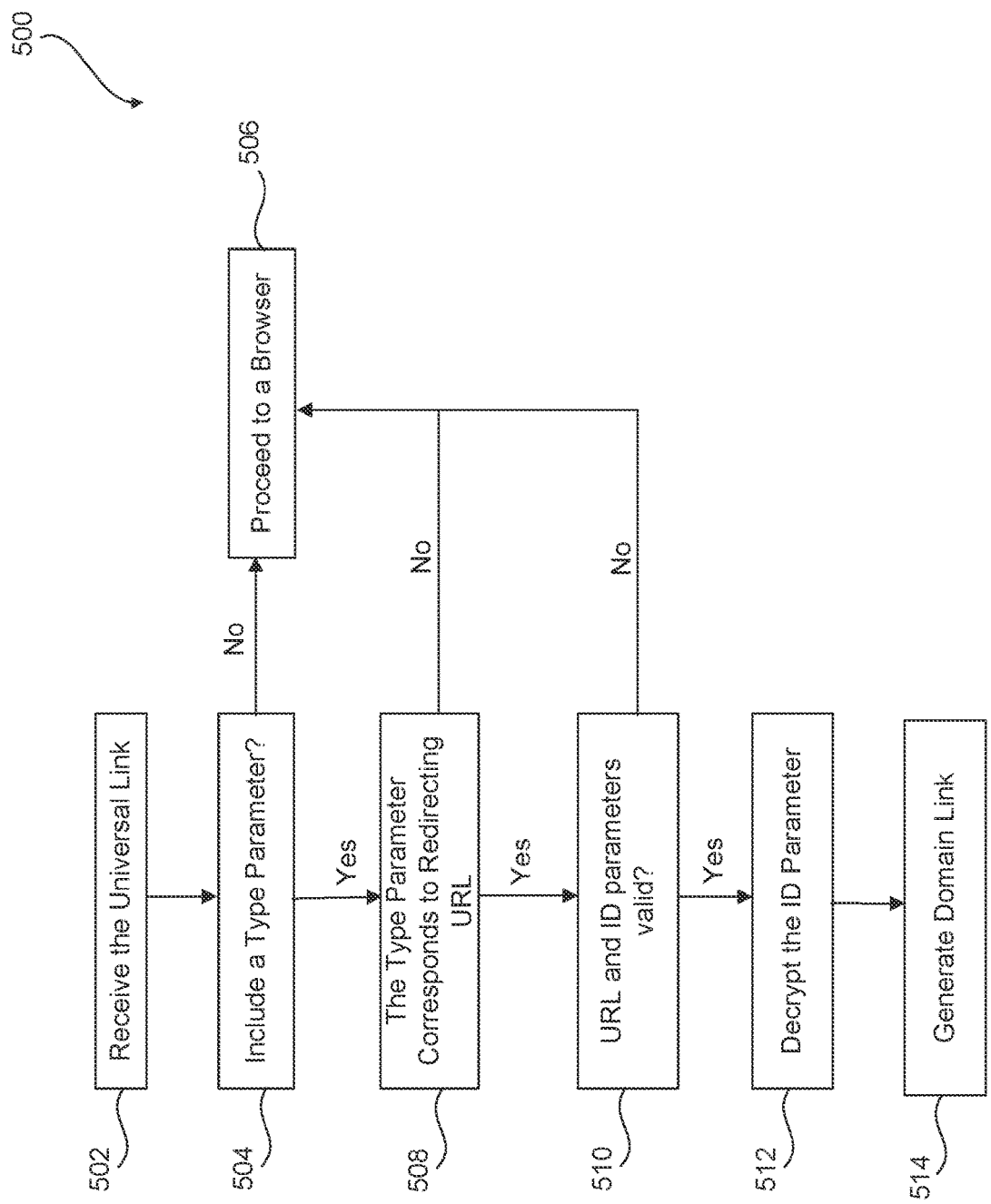
FIG. 5 illustrates an example method for determining whether a parsed universal link is valid, according to embodiments of the disclosure.

FIG. 5 illustrates an example method for determining whether a parsed universal link is valid, as described in 312 of FIG. 3. As a convenience and not a limitation. FIG. 5 may be described with regard to elements of FIGS. 1, 2, and 9. Method 500 may represent the operation of electronic devices (e.g., the user devices 104 and 112, and the server 106) validating a parsed universal link. The example method 500 may also be performed by system 200 of FIG. 2, controlled or implemented by processor 210, and/or computer system 900 of FIG. 9. But method 500 is not limited to the specific embodiments depicted in those figures and other systems may be used to perform the method, as will be understood by those skilled in the art. It is to be appreciated that not all operations may be needed, and the operations may not be performed in the same order as shown in FIG. 5.

At 502, the user device receives the universal link. As discussed in 304 of FIG. 3, the user device determines that the URL link is a universal link.

At 504, the user device determines whether the universal link includes a type parameter. For example, the universal link may include one or more parameter fields. The type parameter may be a parameter filed named "Type." If the universal link includes the type parameter, the control moves to 508.

At 508, the user device determines whether the type parameter corresponds to redirecting URL. For example, each of the one or more parameter fields may have a value. If a value of the type parameter corresponds to "redirectURL," the user device may determine that the universal link is a redirection link. In such a case, the control moves to 510.

At 510, the user device determines whether a URL parameter and an identification parameter are valid. In some embodiments, the user device extracts the URL parameter and the identification parameter from the universal link. The user device checks whether the URL parameter points to a webpage. For example, the user device may check whether the format of the URL parameter is in compliance with a format requirement of a webpage. The user device may determine that the URL parameter is valid if the format of the URL parameter is in compliance. The user device may also check if a webpage corresponds to the URL parameter is valid. For example, the user device may ping the webpage. If the webpage responds normally, which indicates that the webpage is up, the user device may determine that the URL parameter is valid. On the other hand, the user device may check a format of the identification parameter. For example, the identification parameter may be required to be in compliance with a standard. If the identification parameter is in compliance, the user device may determine that the identification parameter is valid. If both the URL parameter and the identification parameter are valid, the control moves to 512.

At 512, the user device decrypts the identification parameter. In some embodiments, the identification parameter may include sensitive and/or confidential information. Therefore, the identification parameter may be encrypted before transmission. For example, the server, such as the server 106, may encrypt the identification parameter before transmitting the universal link to the user device 112. The user device may decrypt the identification parameter after receiving the universal link.

At 514, the user device generates a domain link based on the URL parameter and the decrypted identification parameter. For example, the user device may combine the URL parameter and decrypted identification parameter to form the domain link. In some embodiments, the domain link points to a location of a domain, such as the domain 110, that stores a piece of information shared. The user device may connect the domain and retrieve the piece of information based on the domain link.

Referring back to 504, if the user device determines that the universal link does not include a type parameter, the control moves to 506.

At 506, the user device proceeds to a browser. For example, the user device may launch a default browser and open the universal link using the default browser. In such a case, the user device no longer attempts to open the universal link using the application, but treats the universal link as a common URL to be opened by a browser. In some embodiments, the user device may have already launched the application. In such a case, the user device may switch to the default browser and exit the application.

Referring back to 508, the user device may determine that the value of the type parameter does not correspond to "redirectURL," and the control moves to 506. At 506, similar to the discussion above, the user device may launch the default browser and open the universal link using the default browser.

Referring back to 510, the user device may determine that the URL parameter or the identification parameter is not valid. For example, the user device may determine that the format of the URL is not in compliance with the format requirement or the webpage corresponding to the URL parameter is down. For another example, the user device may determine that the identification parameter has an improper format. In such cases, the control moves to 506. At 506, similar to the discussion above, the user device may launch the default browser and open the universal link using the default browser.

Figure 6:
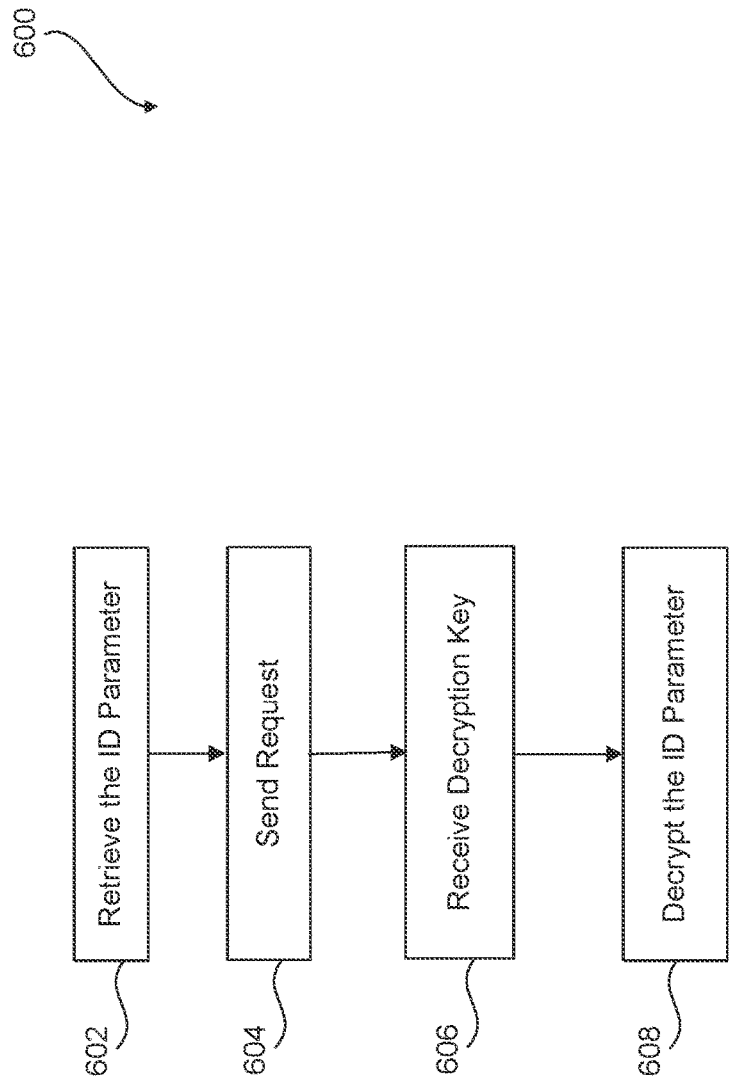
FIG. 6 illustrates an example method for decrypting an identification parameter, according to embodiments of the disclosure.

FIG. 6 illustrates an example method for decrypting an identification parameter, as described in 512 of FIG. 5. As a convenience and not a limitation, FIG. 6 may be described with regard to elements of FIGS. 1, 2, and 9. Method 600 may represent the operation of electronic devices (e.g., the user devices 104 and 112, and the server 106) decrypting the identification parameter. The example method 600 may also be performed by system 200 of FIG. 2, controlled or implemented by processor 210, and/or computer system 900 of FIG. 9. But method 600 is not limited to the specific embodiments depicted in those figures and other systems may be used to perform the method, as will be understood by those skilled in the art. It is to be appreciated that not all operations may be needed, and the operations may not be performed in the same order as shown in FIG. 6.

At 602, the user device retrieves the identification parameter from the universal link as described in 512 of FIG. 5. In some embodiments, the identification parameter may be decrypted using a decryption key. The server, such as the server 106, may encrypt the identification parameter using an encryption method including a symmetric encryption method or an asymmetric encryption method. A user, such as the user 102 or the user 114 may select the encryption method. The encryption method may also be configured at a time of tenant provisioning. For example, the server 106 may configure the encryption method when establishing the domain 110.

At 604, the user device may send a request for the decryption key to the server, such as the server 106. In some embodiments, the request may include the app identification of the application of the user device. The request may also indicate the universal link.

At 606, the user device receives a decryption key from the server. In some embodiments, the server may authenticate the user device before sending the decryption key to the user device. For example, the server may determine that the application is authorized based on the app identification included in the request and send the decryption key to the user device. The request for the decryption key may include other identifications that allow the server to authorize sending the decryption key to the user device.

At 608, the user device decrypts the identification parameter using the decryption key.

Figure 7:
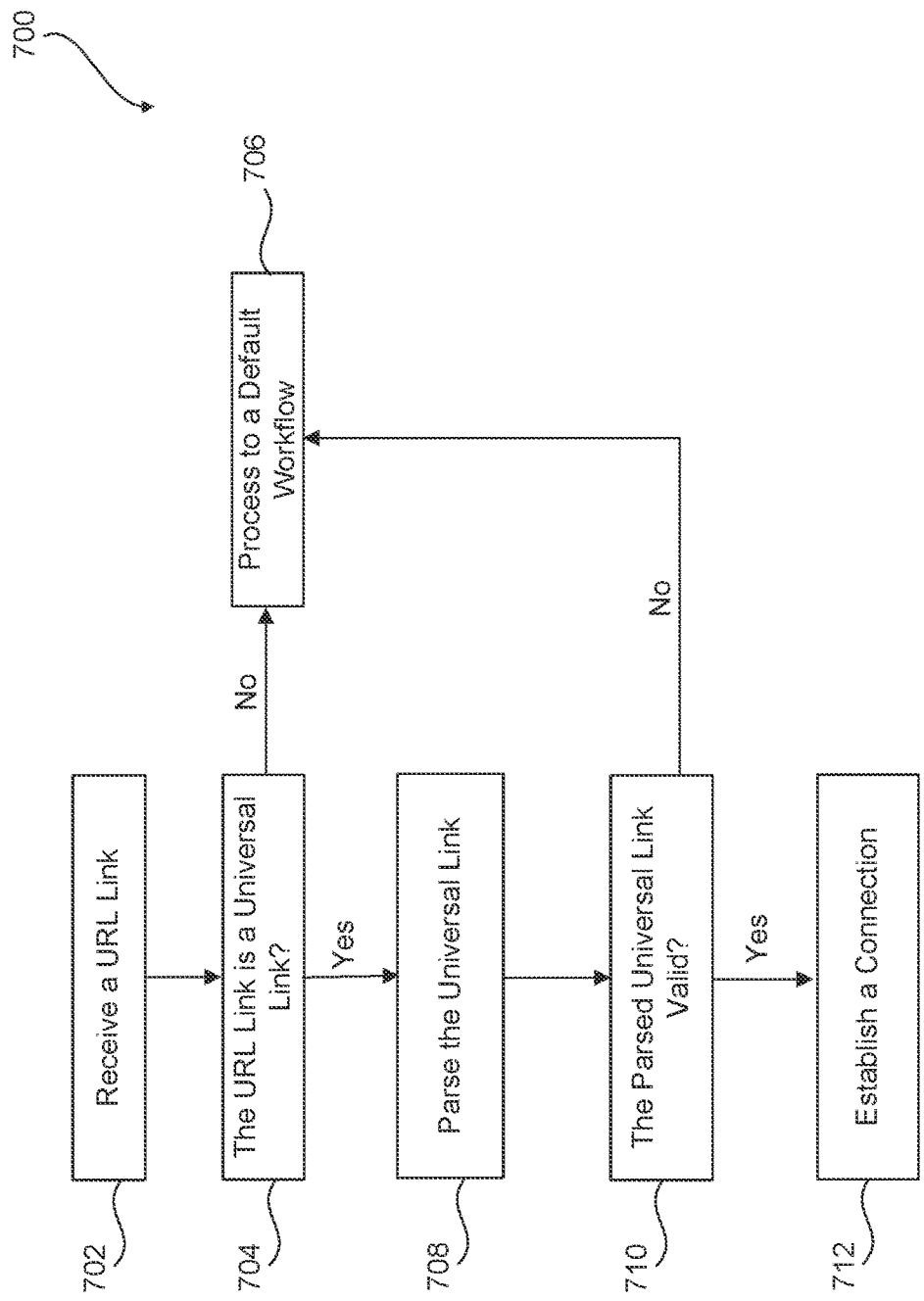
FIG. 7 illustrates an example method for an efficient and secure universal/app link in a terminal device, according to embodiments of the disclosure.

FIG. 7 illustrates an example method for an efficient and secure universal/app link in a terminal device, according to embodiments of the disclosure. As a convenience and not a limitation. FIG. 7 may be described with regard to elements of FIGS. 1, 2, and 9. Method 700 may represent the operation of electronic devices (e.g., the user devices 104 and 112, and the server 106). The example method 700 may also be performed by system 200 of FIG. 2, controlled or implemented by processor 210, and/or computer system 900 of FIG. 9. But method 700 is not limited to the specific embodiments depicted in those figures and other systems may be used to perform the method, as will be understood by those skilled in the art. It is to be appreciated that not all operations may be needed, and the operations may not be performed in the same order as shown in FIG. 7.

At 702, a terminal device, such as the user device 112 receives a URL link. In some embodiments, the user device may be a desktop device that receives the URL link from a user device, such as the user device 104. In other embodiments, the terminal device may receive the URL link from a server, such as the server 106. The terminal device may receive the URL link via a wireless connection or a wired connection.

At 704, the terminal device determines whether the URL link is a universal link. In some embodiments, the terminal device may extract a standard domain from the URL link. Furthermore, the terminal device may include a list of universal link domains. If the list of universal link domains includes the standard domain, the terminal device may determine that the URL link is a universal link. The control moves to 708.

At 708, the terminal device may parse the universal link to obtain a domain link. In some embodiments, the domain link stores a piece of information that is shared between the terminal device and the user device. For example, the piece of information is stored in the domain 110 and the domain link may correspond to the domain 110. The user device 104 may share the domain link to the terminal device, such as the user device 112, which may obtain that piece of information from the domain 110 based on the domain link.

At 710, the terminal device checks whether the parsed universal ink is valid. In other words, the terminal device checks whether the domain link is valid. More details are discussed above in FIG. 5. If the domain link is valid, the control moves to 712.

At 712, the terminal device establishes a connection with a domain corresponding to the domain link. For example, the terminal device, such as the user device 112 may establish a connection to the domain 110 based on the domain link. The connection may be a wireless connection or a wired connection. The terminal device may further extract the piece of information, which is shared by the user device 104, from the domain 110 based on the domain link.

Referring back to 704, if the terminal device determines that the URL link is not a universal link, the control moves to 706.

At 706, the terminal device proceeds to a default workflow. For example, the terminal device may open the URL link using a default browser.

Referring back to 710, if the terminal device determines that the parsed universal link is not valid, the control moves to 706. Similar to the discussion above, at 706, the terminal device may open the universal link in the default browser. In other words, the parsed universal link is ignored and the terminal device proceeds with the universal link instead.

Figure 8:
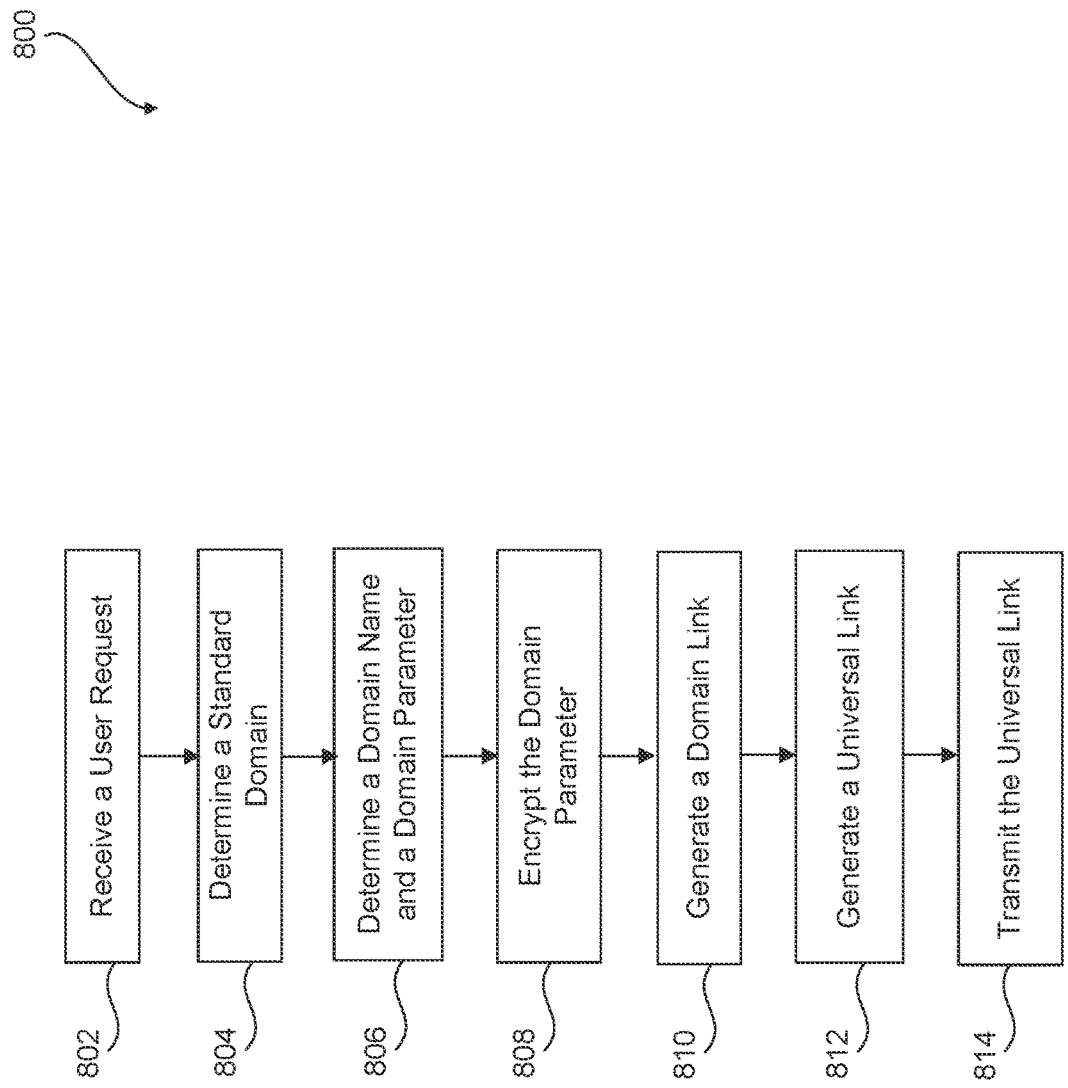
FIG. 8 illustrates an example method for an efficient and secure universal/app link in a server, according to embodiments of the disclosure.

FIG. 8 illustrates an example method for an efficient and secure universal/app link in a server, according to embodiments of the disclosure. As a convenience and not a limitation, FIG. 8 may be described with regard to elements of FIGS. 1, 2, and 9. Method 800 may represent the operation of electronic devices (e.g., the user devices 104 and 112, and the server 106). The example method 800 may also be performed by system 200 of FIG. 2, controlled or implemented by processor 210, and/or computer system 900 of FIG. 9. But method 800 is not limited to the specific embodiments depicted in those figures and other systems may be used to perform the method, as will be understood by those skilled in the art. It is to be appreciated that not all operations may be needed, and the operations may not be performed in the same order as shown in FIG. 8.

At 802, a server, such as the server 106, receives a user request. For example, the user request may indicate that the user 102 wants to transmit a message to the user 114. The message may include a piece of information stored in the domain 110. The server 106 may receive the user request from the user device 104.

At 804, the server determines a standard domain based on the user request. In some embodiments, the server determines that the user is associated with a physical location. For example, the server may determine that the user is located in the physical location. The server may also determine that the user is registered with the physical location. The physical location may be a geographical region, such as the North American region, the Asian region, and the European region. The standard domain may be assigned to the physical location and thus the server determines that standard domain based on the physical location.

At 806, the server determines a domain name and a domain parameter. The server, such as the server 106, may determine that the piece of information is stored in the domain 110. Therefore, the server 106 may determine that the domain name is the domain 110. Furthermore, the server 106 may determine the domain parameter based on a location and/or characteristic of the piece of information. For example, the domain parameter may indicate the location in the domain 110 that stores the piece of information. The domain parameter may also indicate a size, a format, metadata, or other information of the piece of information.

At 808, the server device encrypts the domain parameter. As discussed above, the domain parameter may include sensitive and/or confidential information. In some embodiments, the server may include an encryption module that encrypts the domain parameter.

At 810, the server generates a domain link based on the domain name and the encrypted domain parameter. For example, the server may combine the domain name and the encrypted domain parameter.

At 812, the server generates a universal link based on the domain link. In some embodiments, the server may add the domain name and the domain parameter as one or more parameters into the standard domain. For example, the server may add a type parameter to the standard domain, wherein the type parameter corresponds to redirecting URL, such as "redirectURL." The server may also add a URL parameter to the standard domain, wherein the URL parameter includes the domain name. The server may also add an identification parameter to the standard domain, wherein the identification parameter includes the encrypted domain parameter. For example, the universal link may be "https://xyzdomain.cloud?type=redirectURL&url=abcdomain.com&id=123xyz," wherein the standard domain corresponds to "xyzdomain.cloud," wherein the domain name of the URL parameter corresponds to "abcdomain.com," and wherein the identification parameter corresponds to "123xyz."

At 814, the server, such as the server 106, transmits the universal link to another user device, such as the user device 112. The server 106 may transmit the universal link directly to the user device 112 directly. The server 106 may also transmit the universal link to the user device 112 indirectly via the user device 104.

Figure 9:
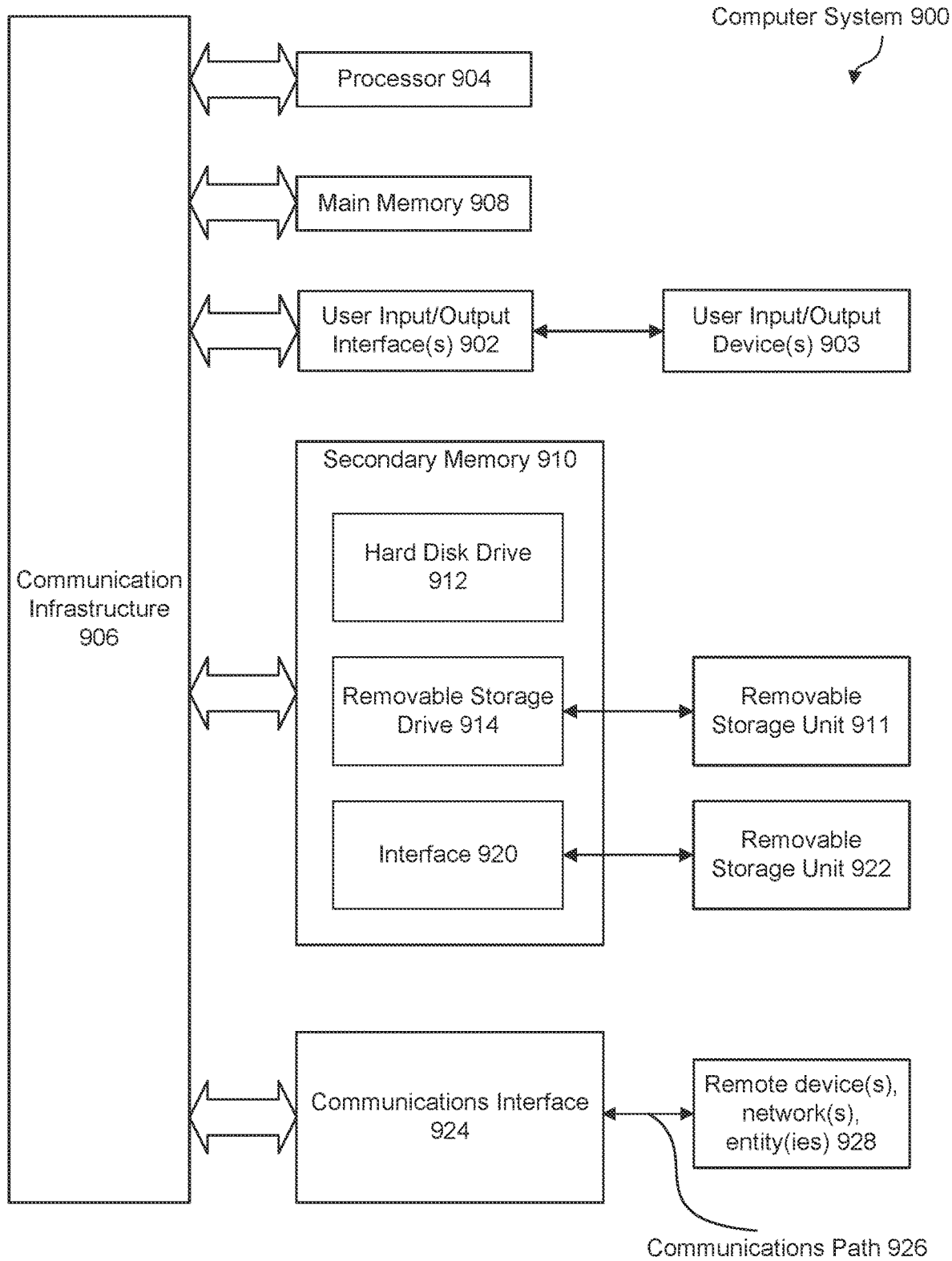
FIG. 9 is an example computer system for implementing some embodiments of the disclosure or portion(s) thereof.

Various embodiments may be implemented, for example, using one or more computer systems, such as computer system 900 shown in FIG. 9. Computer system 900 may be any well-known computer capable of performing the functions described herein such as the user devices 104 and 112 and the server 106 of FIG. 1, or 200 of FIG. 2. Computer system 900 includes one or more processors (also called central processing units, or CPUs), such as a processor 904. Processor 904 is connected to a communication infrastructure 906 (e.g., a bus.) Computer system 900 also includes user input/output device(s) 903, such as monitors, keyboards, pointing devices, etc., that communicate with communication infrastructure 906 through user input/output interface(s) 902. Computer system 900 also includes a main or primary memory 908, such as random access memory (RAM). Main memory 908 may include one or more levels of cache. Main memory 908 has stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to some embodiments, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

The operations in the preceding embodiments may be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 900, main memory 908, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user device comprising:
   a transceiver configured to communicate with a server; and
   a processor, communicatively coupled to the transceiver, and configured to:
      receive, via the transceiver, a uniform resource locator (URL) from the server;
      determine that the URL is a universal link;
      authenticate the universal link;
      parse the universal link to obtain a domain link;
      connect to the domain link;
      determine a standard domain based on the universal link; and
      determine that the standard domain is associated with an application of the user device by:
         extracting a list of domains supported by the application from the application;
         determining that the list of domains includes the standard domain; and
         determining that the application is authorized to access the standard domain by:
            transmitting a request for an authentication file of the standard domain to the server;
            receiving the authentication file from the server;
            determining an application identification of the application; and
            determining that the authentication file includes the application identification of the application.

2. The user device of claim 1, wherein to parse the universal link to obtain the domain link, the processor is configured to:

determine that the universal link is a redirection link; and in response to determining that the universal link is the redirection link, extract the domain link from the universal link.

3. The user device of claim 2, wherein to determine that the universal link is the redirection link, the processor is configured to:
   determine that the universal link includes a type parameter; and
   determine that the type parameter corresponds to redirecting the URL.

4. The user device of claim 2, wherein to extract the domain link from the universal link, the processor is configured to:
   determine that the universal link includes a URL parameter;
   extract a domain name from the URL parameter;
   determine that the universal link includes an identification parameter;
   determine a domain parameter based on the identification parameter; and
   determine the domain link based on the domain name and the domain parameter.

5. The user device of claim 4, wherein to determine the domain parameter based on the identification parameter, the processor is configured to:
   extract an encrypted parameter from the identification parameter; and
   decrypt the encrypted parameter to obtain the domain parameter.

6. The user device of claim 5, wherein to decrypt the encrypted parameter, the processor is configured to:
   send a request for a decryption key to the server;
   receive the decryption key from the server; and
   decrypt the encrypted parameter based on the decryption key.

7. The user device of claim 1, wherein to determine that the URL is the universal link, the processor is configured to:
   determine the standard domain based on the URL;
   extract a list of universal link domains from the user device; and
   determine that the list of universal link domains includes the standard domain.

8. The user device of claim 1, wherein to connect to the domain link, the processor is configured to:
   transmit a request for connecting to the domain link to the server;
   receive an approval to connect with the domain link from the server; and
   establish a connection with the domain link.

9. A user device comprising:
   a transceiver configured to communicate with a server; and
   a processor, communicatively coupled to the transceiver, and configured to:
      receive, via the transceiver, a universal link from the server, wherein the universal link includes a standard domain;
      parse the universal link to obtain a domain link, wherein the standard domain is different from the domain link;
      connect to the domain link;
      determine the standard domain based on the universal link; and
      determine that the standard domain is associated with an application of the user device by:
         extracting a list of domains supported by the application from the application;
         determining that the list of domains includes the standard domain; and
         determining that the application is authorized to access the standard domain by:
            transmitting a request for an authentication file of the standard domain to the server;
            receiving the authentication file from the server;
            determining an application identification of the application; and
            determining that the authentication file includes the application identification of the application.

10. The user device of claim 9, wherein to parse the universal link to obtain the domain link, the processor is configured to:
    determine that the universal link is a redirection link;
    determine a domain name and a domain parameter based on the universal link, wherein the domain name is different from the standard domain;
    decrypt the domain parameter; and
    determine the domain link based on the domain name and the decrypted domain parameter.

11. The user device of claim 10, wherein to decrypt the domain parameter, the processor is configured to:
    send a request for a decryption key to the server;
    receive the decryption key from the server; and
    decrypt the domain parameter based on the decryption key.

* * * * *